Aug. 25, 1959     E. P. LINDSTROM     2,900,639
SPECTACLE ATTACHMENT
Filed Oct. 24, 1955
FIG. 1.
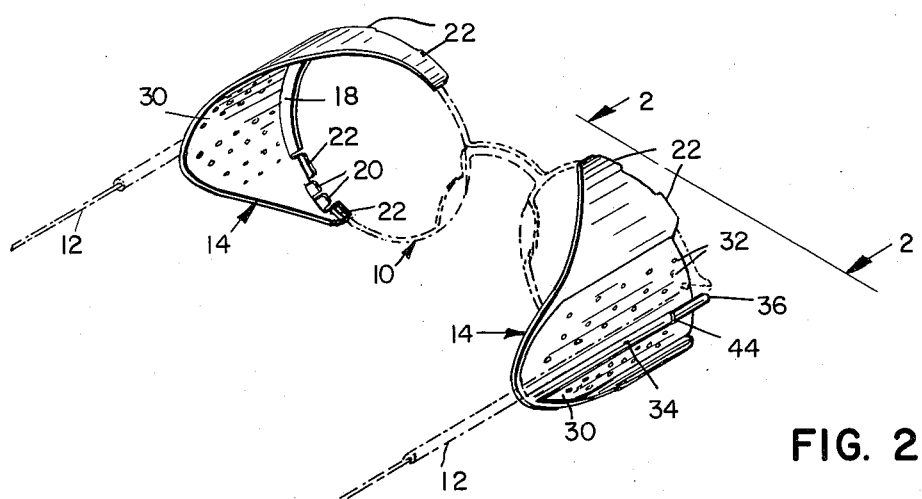
FIG. 2.
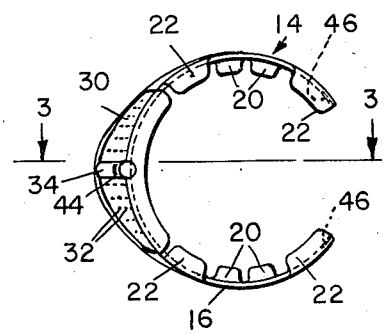
FIG. 3.
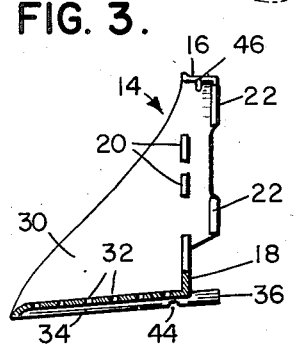
FIG. 5.
FIG. 4.
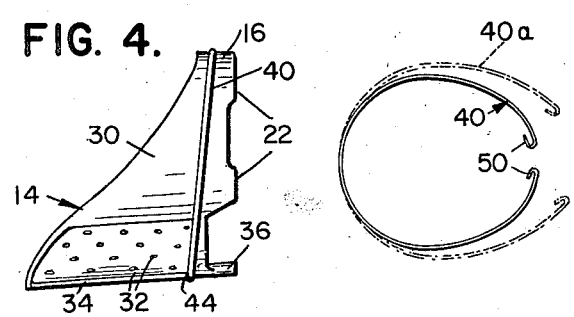
INVENTOR
EVERT P. LINDSTROM
BY
*Albert J. Fihe*
ATTORNEY United States Patent Office
2,900,639
Patented Aug. 25, 1959

2,900,639

SPECTACLE ATTACHMENT

Evert P. Lindstrom, Burbank, Calif.

Application October 24, 1955, Serial No. 542,177

1 Claim. (Cl. 2—13)

This invention relates to an improved spectacle attachment, and has for one of its principal objects the provision of a detachable side shield for spectacles which will produce additional protection to the wearer with a minimum expenditure of time and effort.

One of the important objects of this invention is the quick conversion of safety spectacles for protecting the eyes of industrial workers from the hazards of side exposure to flying metal or other particles, chemicals, dust, harmful light rays or other elements inherent in industrial processes.

Another important object of this invention is to provide a device of the class described, comprising a pair of side shields which can be readily attached to any ordinary or special eye glasses or spectacles for desired side protection whenever necessary and which can also be as readily removed when not desired. No tools are necessary.

Another and further important object of the invention is to provide sets of side shields which will convert spectacles or eye glasses into safety spectacles and which will eliminate the necessity of the stocking by industrial concerns of several sizes of spectacles, colors for anti-glare, and other variations, both with and without side shields, which procedure is bothersome and expensive.

Yet another important object of the invention consists in the production of side shields which can be worn with prescription or plain eye glasses by persons afflicted with certain eye diseases or who have had operations, following which the eyes must be protected from lateral as well as frontal glare for a period of time.

Other and further important objects will be apparent from the disclosures in the accompanying drawings and following specification.

The invention, in a preferred form, is illustrated in the drawings and hereinafter more fully described.

In the drawings:

Figure 1 is a perspective view of a representative pair of eye glasses or spectacles, showing the same as equipped with the attachments or side shields of this invention.

Figure 2 is a front elevation of one of the attachments or side shields of this invention, showing the same as viewed from the plane of the line 2—2 of Figure 1.

Figure 3 is a sectional view, taken on the line 3—3 of Figure 2, looking in the direction indicated by the arrows.

Figure 4 is a side elevation of one of the improved attachments of this invention, illustrating a modified form of the invention.

Figure 5 is an elevation of the spring clip applied to the modified type of attachment illustrated in Figure 4.

As shown in the drawings:

The reference numeral 10 indicates generally a pair of eye glasses or spectacles of any ordinary special or usual type and preferably those having rims for the lenses, and temples 12 of cable or spatula type, adapted to fit over the ears of the wearer. These also may be of various species.

The attachments or side pieces of this invention are indicated generally by the reference numerals 14 in Figure 1 and comprise arcuate elements approximately 300 degrees in extent which are adapted to be removably fitted onto the spectacles or eye glass frames 10.

As best shown in Figures 2 and 3, the arcuate portions, or rims, designated in those figures by the reference numeral 16, include an integral inturned ledge 18 which is in a plane slightly inwardly of the plane of the outer edge of the arcuate element or rim 16.

Likewise in the same plane as the element 18 are two pairs of integral inwardly extending lugs or protuberances 20.

Arranged along the outer edge or rim of the arcuate element 16 are four or more inturned projections, flanges, or protuberances 22, which likewise comprise an integral part of the construction.

The ridge or flange 18 with its aligned projections 20, are spaced from the inturned flange elements or protuberances 22, a distance approximating or slightly greater than the width of the spectacle frame elements 10, and the arcuate shape of the rim 16, while being approximately circular, conforms in general outline to the usual shape or contour of the average spectacle frame 10.

The material of the attachments, or side clips, is plastic, such as butyrate acetate or some similar material which has a certain amount of resiliency whereby the rim element 16 can be sprung apart to a certain extent and then fitted onto or about the spectacle frame 10, after which it is allowed to snap into position whereupon it will be securely held in place.

Also integral with the rim element 16 and its flanges and protuberances 18, 20, and 22, is a side extension 30 shaped as best shown in Figure 3, so as to fit about the temples of the wearer after being fixed on the spectacles. Here again the shape or contour is such as it will conform in substantially all respects to a normal face or skull configuration, whereby a desired fairly close fit results.

The portion 30 is perforated as shown at 32 for suitable ventilation and this perforated section is usually thinner than the remaining portion, being of an extent corresponding to the length of the ledge 18 where it adjoins the rim 16. This is variable.

Also forming an integral portion of the structure of the attachment is a ridge 34 which divides the perforated portion into two parts and which terminates in an outward extension or pin 36, adapted to serve as a stop when placed against the temple 12 of the spectacle frame 10. This prevents the attachment from riding around the frame portion 10 into an undesirable or uncomfortable position.

In the modification shown in Figures 4 and 5 a spring clip of wire or the like 40 is fitted about the rim portion 16 whereby the resilient action inherent to the plastic attachment in enhanced. The spring clip 40 is arcuate as shown in Figure 5 and approximately 300° in circular extent. It is normally of a slightly less diameter than the diameter of the rim 16 so that when fitted into position about the rim it will assist in constraining the same into a desired contacting relationship with the spectacle frame 10. In the full lines of Figure 5 the normal contour of the clip 40 is illustrated and the broken lines 40A show the same as placed in position about the attachment, whereupon a satisfactory spring effect prevails. The shape of the spring can be changed to meet varying frame shape requirements.

A notch 44 is formed in the ridge 34 for the reception of that part of the spring clip 40 and similar notches 46 are formed in the ends of the rim 16. These receive the bent-over hook-like portions 50 of the spring clip when the same is properly positioned, whereby a better retaining action is effected.

The spring wire clip 40 assures of a proper fitting and position retention of the attachment at all times and even under adverse conditions of temperature and wear. Some plastic products will lose resiliency if subjected to more than normal heat, such as in welding operations, and others will lose resiliency after repeated flexings. The spring steel reinforcing ring will assure long life and proper shape throughout.

Many safety glasses are equipped with prescription lenses, which are obviously expensive and if an employee's work requires side shield protection, a second pair of prescription glasses is necessary for wearing to and from work and when off duty. Safety spectacles with attached side shields are not desirable for general wear, but with this invention prescription safety glasses can be used with the attachment while on the job and with no attachment at all other times.

The side shield attachment of this invention offers more protection to the eyes of the wearer, both above and below the lenses than any permanently attached side shield.

The plastic or other material from which the device of this invention is formed, can be either clear, translucent, colored, and it has been found that the material employed meets all accepted safety equipment standards and requirements, such as impact resistance, chemical resistance and resistance to heat and flame. The models which are colored, as for example green, will have desired resistance to certain types and degrees of harmful light rays.

Additionally, the side shield of this invention is so constructed that it will fit on either the right or left of a spectacle frame with no change whatsoever, but if desired, rights and lefts can be constructed.

It will be evident that herein is provided an attachment for spectacles, which will immediately produce a safety device which will shield the eyes of the wearer from flying particles while at work, or in bad weather, sleet storms, dust storms, blizzards, etc. and which will be useful after eye operations, with the added advantages of removability. The device is easily molded of desired plastic or other material in a one piece construction and will fit practically any type, size, or contour of spectacles, whether those ordinarily worn or safety glasses used at work.

The clips or protuberances are so arranged for a firm grip at all points while at the same time preventing any ingress of dust or other particles between the shield and the edges of the eye glass frame. The projections 20, near the ends of the shield rim, are split or separated as shown in Figures 2 and 3 to permit a better bending of that portion of the shield when it is applied to the frame of the eye glasses or spectacles.

The clips themselves are very light in weight and are accordingly practically unnoticeable when in use by the wearer and the resilient spring wire clip assures of a desired fitting and retention under any and all circumstances.

I am aware that many changes may be made and numerous details of construction varied throughout a wide range, without departing from the principles of this invention, and I, therefore, do not propose limiting the patent granted hereon otherwise than as necessitated by the prior art.

I claim as my invention:

An attachment for spectacles comprising a pair of readily detachable side shields, said shields composed of resilient material for clipping onto the spectacle frames, each shield including an arcuate rim and integral spaced protuberances for contacting and gripping the spectacle frame, the protuberances being in two separate planes, and comprising flange elements extending radially inwardly from the arcuate rim, an integral extension shaped to contact the temple of the wearer, said extension being perforated for ventilation and including a strengthening rib, one of the protuberances being adjacent the connection between the spectacle frame and its temple extension and of greater extent than the others, thereby forming a non-opening flange, certain of the protuberances being split, thereby providing greater resiliency of the adjacent portion of the shield rim, both shields being identical and inter-changeable.

References Cited in the file of this patent

UNITED STATES PATENTS

| | | |
|---|---|---|
| 1,285,226 | King | Nov. 19, 1918 |
| 1,516,261 | Youngquist | Nov. 18, 1924 |
| 1,527,237 | Tully | Feb. 24, 1925 |
| 2,300,365 | Wagner | Oct. 27, 1942 |